(12) United States Patent
Yu

(10) Patent No.: US 6,294,873 B1
(45) Date of Patent: Sep. 25, 2001

(54) INFRARED SENSITIVE ELECTRIC CONTROLLED LAMP SEAT

(76) Inventor: Tsung-I Yu, No. 45, Sec. 3, Pa Te Rd., Pan Chiao City, Taipei (TW)

( * ) Notice: Subject to any disclaimer, the term of this patent is extended or adjusted under 35 U.S.C. 154(b) by 0 days.

(21) Appl. No.: 09/566,999

(22) Filed: May 9, 2000

(51) Int. Cl.[7] .............................. F21V 29/00; F21V 23/00
(52) U.S. Cl. ......................... 315/149; 362/276; 362/373; 362/802
(58) Field of Search .................................. 362/276, 802, 362/74, 218, 373; 315/112, 117, 56–60, 149–159

(56) References Cited

U.S. PATENT DOCUMENTS

| | | | |
|---|---|---|---|
| 5,434,764 | * 7/1995 | Lee et al. | 362/276 |
| 5,626,417 | * 5/1997 | McCavit | 362/802 |
| 5,823,660 | * 10/1998 | Hsu | 362/276 |
| 6,200,007 | * 3/2001 | Minissi et al. | 362/373 |

* cited by examiner

*Primary Examiner*—Don Wong
*Assistant Examiner*—Wilson Lee
(74) *Attorney, Agent, or Firm*—Varndell & Varndell, PLLC

(57) ABSTRACT

An infrared sensitive electric controlled lamp seat serves to control the illumination of a bulb automatically. The infrared sensitive electric controlled lamp seat includes a lamp seat and an electric controlled device. The lamp seat is an power transferring case having a U shape cone-like shape, and the upper end thereof is installed with a conductive stud, while the lower end thereof is installed with a cone net bulb fixing case. The bottom of the bulb fixing case is installed with a conductive stud for locking the bulb. The electric controlled device is a circuit board. The center of the bottom is installed with an infrared sensing head. The circuit board is firmly secured to the bulb fixing case so that the infrared sensing head is exactly protected in the net case. The power transferring case serves to cover the upper portion of the bulb fixing case. Therefore, an infrared sensitive electric controlled lamp seat is formed. Thus, the present invention can be installed to another lamp seat for inserting a bulb so as to automatically sense and control the illumination of a bulb.

6 Claims, 4 Drawing Sheets

INFRARED SENSITIVE ELECTRIC CONTROLLED LAMP SEAT

FIELD OF THE INVENTION

The present invention relates to an infrared sensitive electric controlled lamp seat, and especially to a lamp seat which can be installed to an original lamp seat, while in a range, it can detect the moving of a people and then control the illumination of a bulb.

BACKGROUND OF THE INVENTION

Light has become a necessary power in daily life. By the invention of bulbs, fluorescent lamp, and other illuminating devices. Therefore, peoples may work at any time. Therefore, bulbs, fluorescent lamps, and other illuminating devices are used anywhere. For convenience, often peoples do not turn off the lamp as they leave from a room. Even nobody is in the room, the lamp still lights up. Therefore, power waste is formed.

Moreover, the switches of bulbs, fluorescent lamps, and other illumination devices are installed at corners of walls. In the night, people can not search for the switch in the dark. This is not matched the use of the illuminating device.

Therefore, there is an eager demand of a novel designed in which in a range, it can detect the moving of a people and then control the illumination of a bulb.

SUMMARY OF THE INVENTION

Accordingly, the primary object of the present invention is to provide an infrared sensitive electric controlled lamp seat for controlling the illumination of a bulb automatically. The infrared sensitive electric controlled lamp seat includes a lamp seat and an electric controlled device. The lamp seat is a power transferring case having a U shape cone-like shape, and the upper end thereof is installed with a conductive stud, while the lower end thereof is installed with a cone net bulb fixing case. The bottom of the bulb fixing case is installed with a conductive stud for locking the bulb. The electric controlled device is a circuit board. The center of the bottom is installed with an infrared sensing head. The circuit board is firmly secured to the bulb fixing case so that the infrared sensing head is exactly protected in the net case. The power transferring case serves to cover the upper portion of the bulb fixing case. Therefore, a infrared sensitive electric controlled lamp seat is formed. Therefore, the present invention can be installed to another lamp seat for inserting a bulb to automatically sense and control the illumination of a bulb.

The various objects and advantages of the present invention will be more readily understood from the following detailed description when reading in conjunction with the appended drawing.

DETAILED DESCRIPTION OF THE PREFERRED EMBODIMENTS

Figure 1:
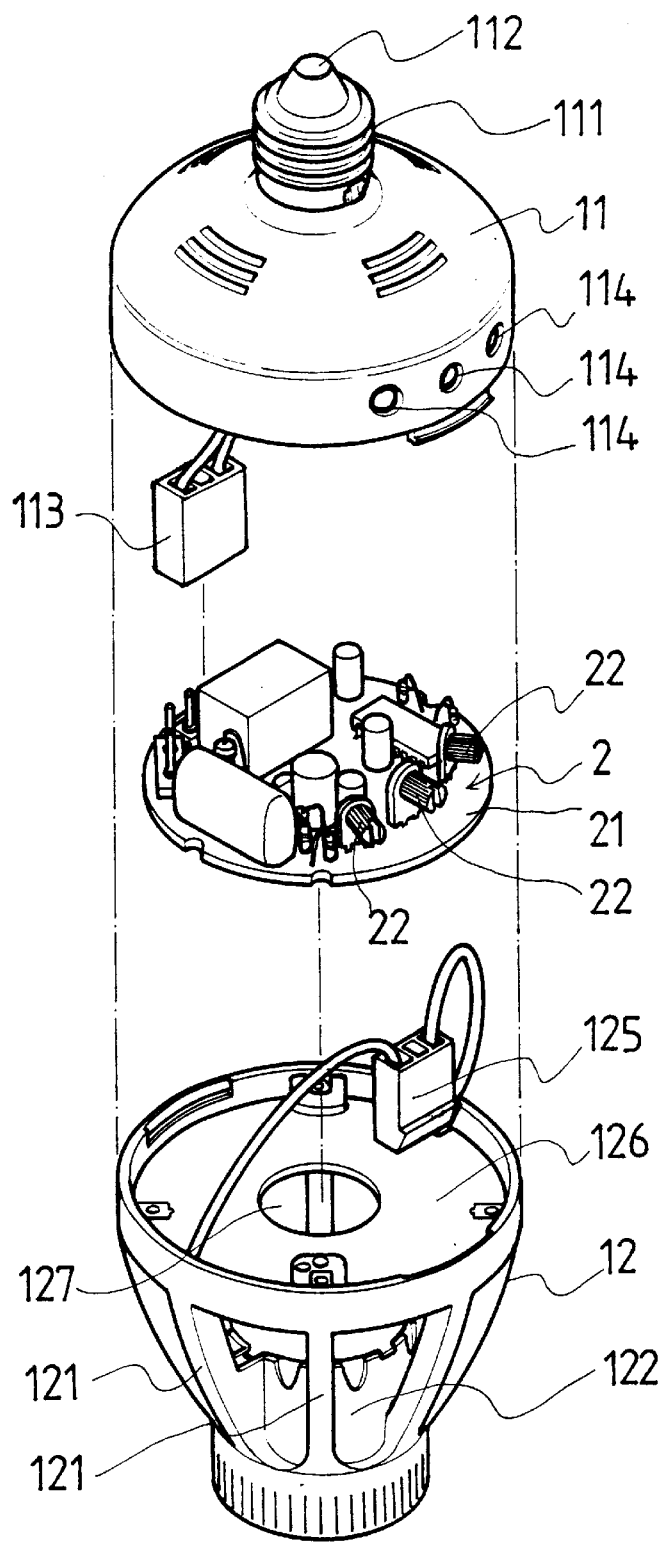
FIG. 1 is an exploded perspective view of the present invention.
Figure 2:
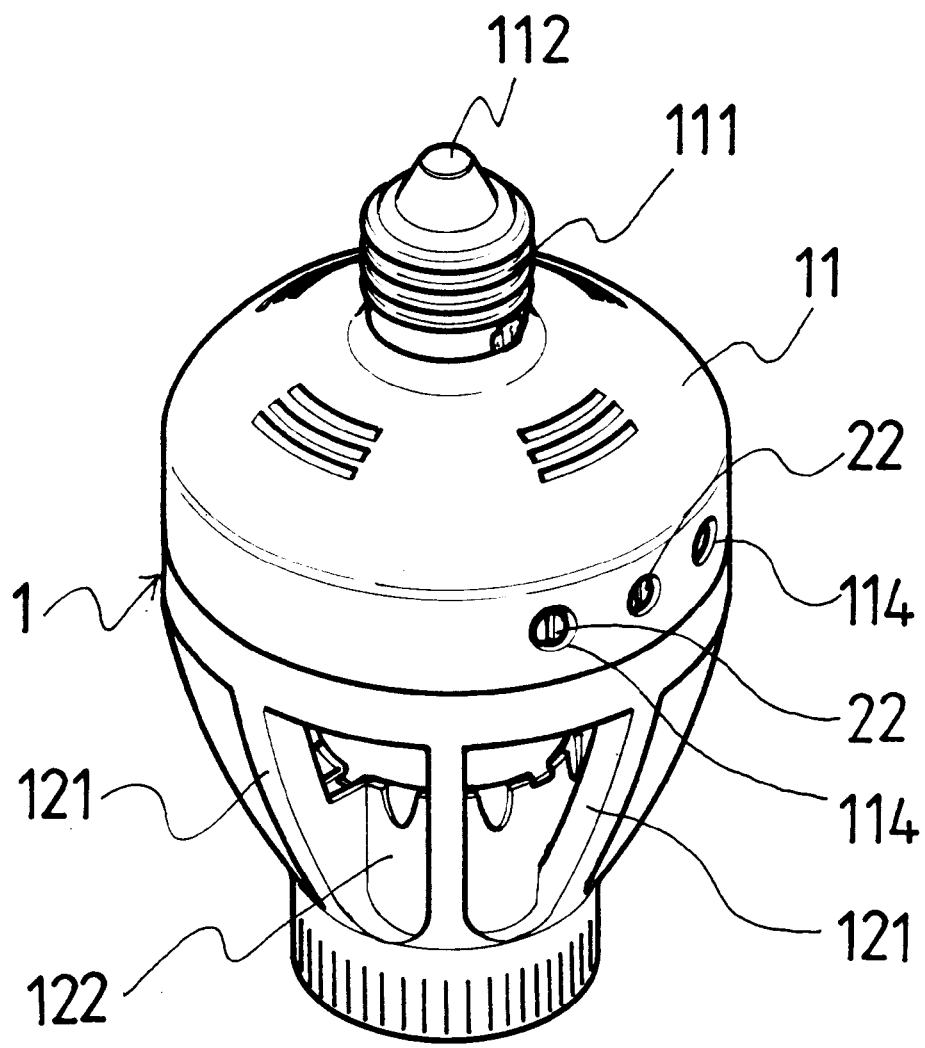
FIG. 2 is an assembled perspective view of the present invention.

With reference to FIGS. 1 and 2, the infrared sensitive electric controlled lamp seat of the present invention is illustrated herein. The infrared sensitive electric controlled lamp seat according to the present invention includes a lamp seat 1 and an electric controlled device 2.

The lamp seat 1 is formed by a power adapting case 11 and a lamp fixing case 12 (as shown in FIG. 11).

The power adapting case 11 is a U shape round case and three through holes 114 are installed at the periphery thereof. The top of the power adapting case 11 is installed with a metal conductive stud 111 hereby, the conductive stud 111 serves as the conductive portion of a grounding line. The end portion of the conductive stud 111 is further installed with a metal noise portion 112 so as to be formed as a conductive portion of a fire wire. Each of the conductive stud 111 and the noise portion 112 is extended with an electric wire to be connected to a rectangular receptacle 113.

Figure 3:
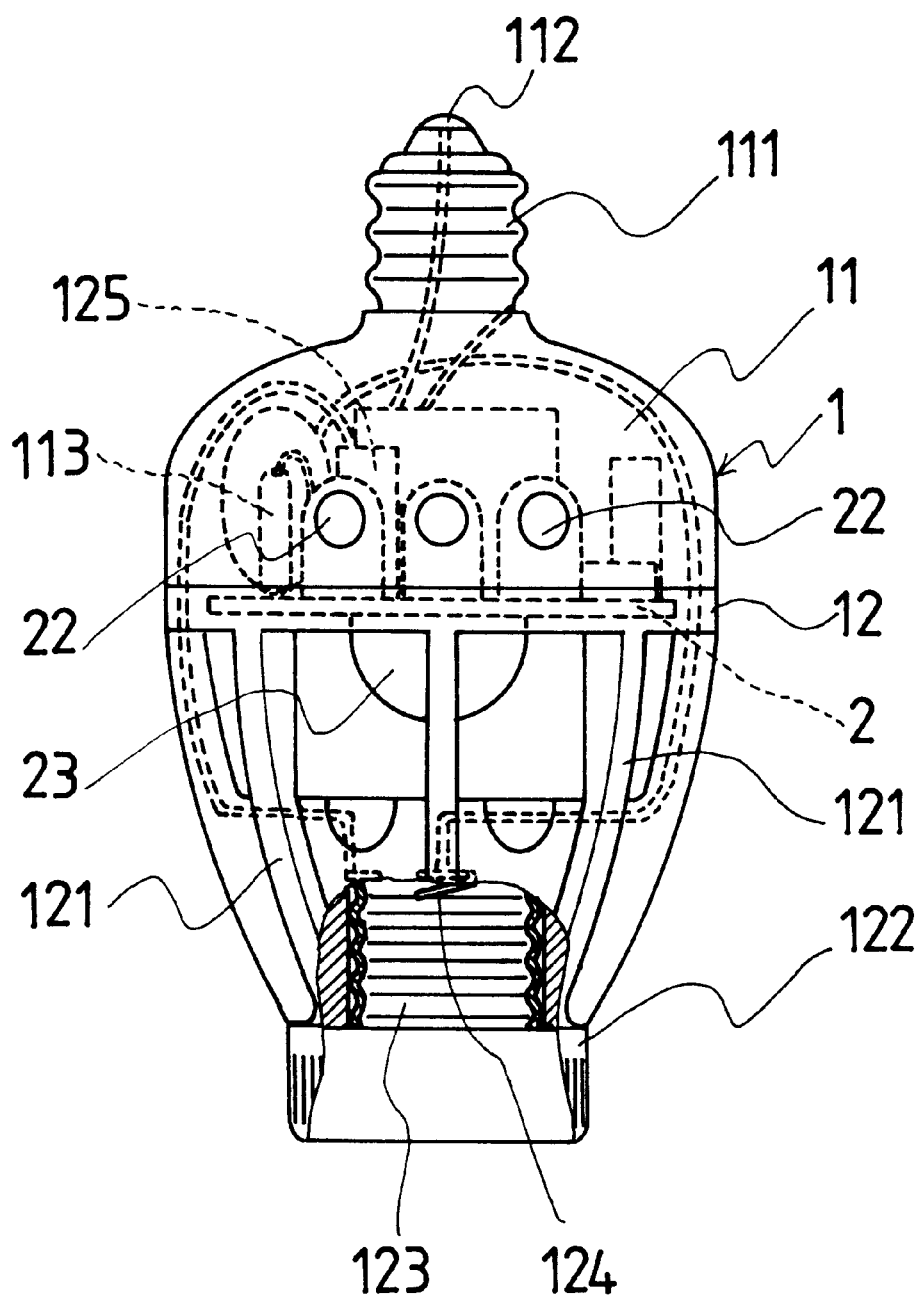
FIG. 3 is an assembled lateral view of the present invention.

The lamp fixing case 12 is a semi-elliptical hollow net case. The periphery thereof is uniformly distributed with hollow ribs 121, and the lower portion thereof is formed with a cylindrical screw hole seat 122 in which a metal threaded cover 123 is installed in the hole seat so as to be formed as a conductive portion of the ground wire (as shown in FIG. 3). The bottom of the hole is firmly secured with a fire wire conductive piece 124. Each of the threaded cover 123 and the conductive piece 124 is connected to the rectangular plug 125 through an electric wire. Further, the top of the lamp fixing case 12 is flat, and a spacer is installed therein. The center of the spacer 126 has a penetrating hole 127.

The electric controlled device 2 (as shown in FIGS. 1 and 3) is an infrared sensitive electric controlled lamp seat, which is a round circuit board 21. The upper surface thereof is installed with plurality of electric components. The lateral surface is further installed with three adjusting buttons 22. The center of the bottom of the circuit board 21 is an infrared sensor 23.

Thereby, as shown in FIG. 3, the infrared sensor 23 of the electric controlled device 2 can pass through the penetrating hole 127 in the spacer 126 at the upper side of the lamp fixing case 12. The electric controlled device 2 is flatly arranged on the spacer 126, and then the plug 125 of the lamp fixing case 12 is connected to the electric controlled device 2 so that the threaded cover 123 and the conductive piece 124 are electrically connected to the electric controlled device 2. Therefore, the power adapting case 11 can be covered and is fixed to the lamp fixing case 12 so that the adjusting button 22 at the lateral side of the electric controlled device 2 passes through the through hole 114 of the power adapting case. Moreover, the plug 113 of the power adapting case 11 is inserted into and connected to the electric controlled device 2. The conductive stud 111 and noise portion 112 are electrically connected to the electric controlled device 2 in order to be formed with a structure that the lamp seat 1 encloses the electric controlled device 2, and therefore, the infrared sensitive electric controlled lamp seat of the present invention is formed.

Figure 4:
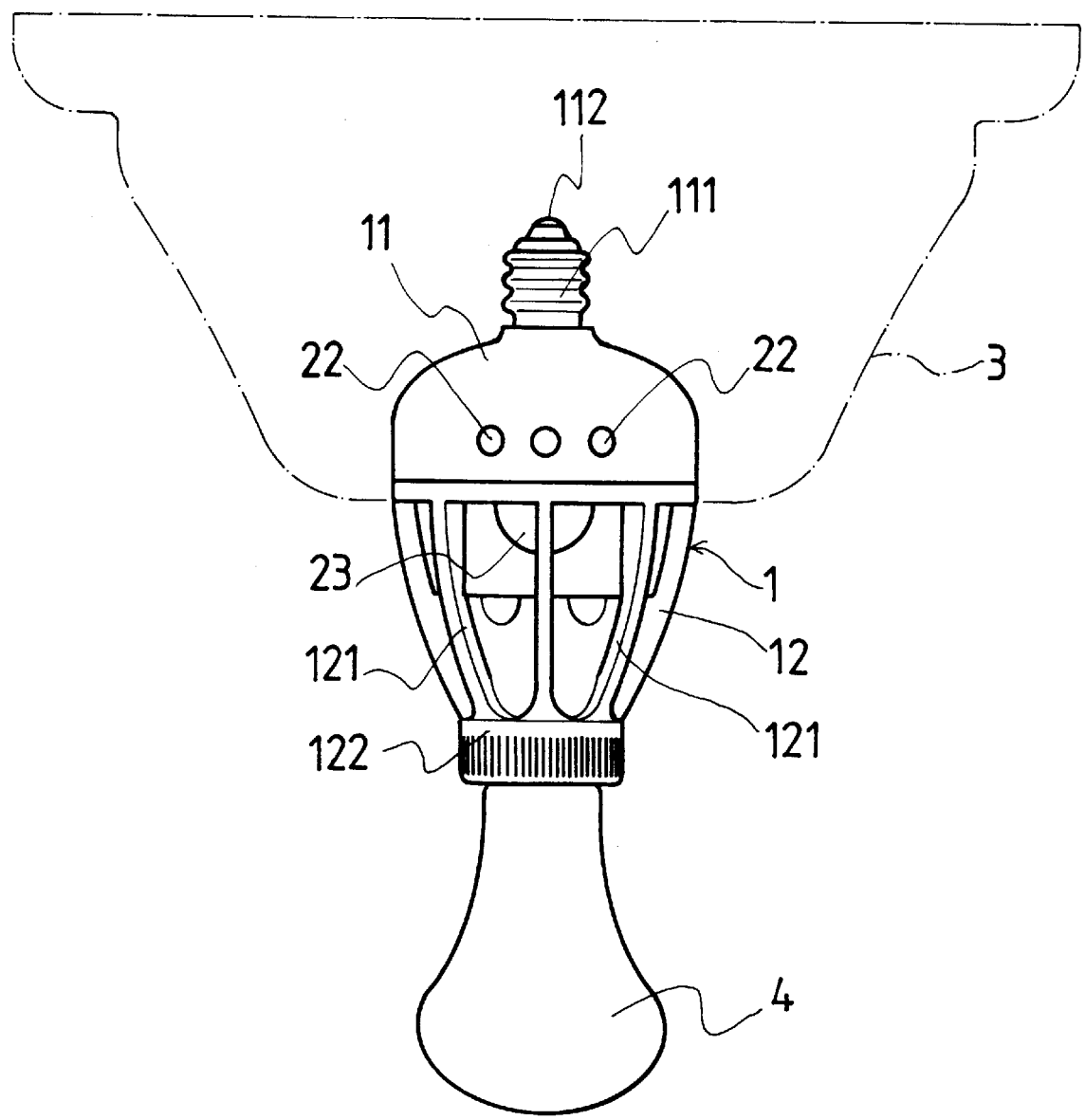
FIG. 4 is a schematic view showing an embodiment of the present invention.

The effect of the present invention is as shown in FIG. 4 that the user may install the lamp seat 1 by installing the conductive stud 111 above the lamp seat 1 to the hole of the lamp seat 3 so that the fire wire of the lamp seat 3 is in contact with the conductive noise portion 112 at the top of the conductive stud 111, and the ground wire of the lamp seat 3 is connected to the conductive stud 111. Therefore, the power of the lamp seat 3 is communicated with the electric controlled device 2. As a result, a bulb 4 can be screwedly installed at the threaded cover 123 within the threaded hole seat 122 at the bottom of the lamp seat 1 and thus the positive electrode at the end portion of the bulb 4 is communicated to the conductive piece 124 and the negative electrode of the bulb 4 is communicated with the threaded cover 123. Thus, the power of the lamp seat 3 can be transferred to the bulb 4 through the electric controlled device 2 so as to be formed as a condition of conduction.

Now, at first, the user can control the electric controlled device 2 to be actuated from the power switch at the wall. Afterwards, as the user is near the lamp seat of the infrared sensitive electric controlled lamp seat, the infrared sensor 23 of the electric controlled device 2 will sense the user to generate a signal so that the electric controlled device 2 supplies power to the bulb 4 to cause the bulb 4 to illuminate and thus the user can touch the power switch in a light environment. Consequently, the defect in the prior art is improved. When the user leaves for a predetermined distance or leave from the room, the infrared sensor 23 of the electric controlled device 2 of the present invention will not sense presence of human body. Therefore, the turning off of power can be controlled by the electric controlled device 2.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An infrared sensitive electric controlled lamp seat comprising a lamp seat and an electric controlled device, wherein the lamp seat is formed by a power adapting case and a lamp fixing case; the power adapting case is a U shape round case; the top of the power adapting case is installed with a metal conductive stud serving as the conductive portion of a grounding line; the end portion of the conductive stud is installed with a metal noise portion so as to be formed as a conductive portion of a fire wire; the lamp fixing case is a cone-like hollow net case: the lower portion thereof is formed with a cylindrical screw hole seat having a metal threaded cover installed in the hole seat so as to be formed as a conductive portion of the ground wire; the bottom of the hole is firmly secured with a fire wire conductive piece; the top of the lamp fixing case is flat, and a spacer is installed therein; the center of the spacer has a penetrating hole;

the electric controlled device is an infrared sensitive electric controlled lamp seat, which is a round circuit board; the upper surface thereof is installed with a plurality of electric components; the center of the bottom of the circuit board is an infrared sensor:

thereby the infrared sensor of the electric controlled device passes through the penetrating hole in the spacer at the upper side of the lamp fixing case; the electric controlled device is flatly arranged on the spacer, then, power adapting case is covered and is fixed to the lamp fixing case; the conductive stud and noise portion are electrically connected to the electric controlled device in order to be formed with a structure in that the lamp seat encloses the electric controlled device, and therefore, an infrared sensitive electric controlled lamp seat is formed.

2. The infrared sensitive electric controlled lamp seat as claimed in claim 1, wherein the power transferring case of the lamp seat has three through holes at the periphery thereof, while at the lateral side of the electric controlled device is installed with three adjusting buttons, after assembled, the adjusting buttons at the lateral side of the electric controlled device pass through the through holes of the power transferring case.

3. The infrared sensitive electric controlled lamp seat as claimed in claim 1, wherein each of the conductive stud and the noise portion is extended with an electric wire to be connected to a receptacle, by inserting the plug to the electric controlled device, the conductive stud and noise portion are electrically connected to the electric controlled device.

4. The infrared sensitive electric controlled lamp seat as claimed in claim 1, wherein the bottom of the hole is firmly secured with a fire wire conductive piece; each of the threaded cover and the conductive piece is connected to the rectangular plug through an electric wire; by inserting the plug into the electric controlled device, so that the threaded cover and the conductive piece are electrically conductive.

5. The infrared sensitive electric controlled lamp seat as claimed in claim 1, wherein the bulb fixing case is a semi-elliptical hollow net case formed by arranging with a plurality of interlaced ribs.

6. The infrared sensitive electric controlled lamp seat as claimed in claim 1, wherein the power transferring case of the lamp seat and the bulb fixing case are made of insulating material.

* * * * *